United States Patent [19]

Preston

[11] Patent Number: 4,458,992
[45] Date of Patent: Jul. 10, 1984

[54] AUTOMATIC EXPOSURE CORRECTION SYSTEM

[76] Inventor: Howard J. Preston, 920 Centinela Ave., Santa Monica, Calif. 90403

[21] Appl. No.: 428,183

[22] Filed: Sep. 29, 1982

[51] Int. Cl.³ .............................................. G03B 7/08
[52] U.S. Cl. ..................................................... 352/141
[58] Field of Search ......................................... 352/141

[56] References Cited

U.S. PATENT DOCUMENTS

| | | | |
|---|---|---|---|
| 4,084,893 | 4/1978 | Flandorfer | 352/141 |
| 4,142,785 | 3/1979 | Saito | 352/141 |
| 4,175,840 | 11/1979 | Kittag | 352/141 |

*Primary Examiner*—Monroe H. Hayes
*Attorney, Agent, or Firm*—W. Edward Johansen

[57] ABSTRACT

The present invention is an automatic exposure correction system for use in combination with a motion picture camera, which includes a lens barrel, a lens iris-ring and a first toothed pulley which is mechanically coupled to the lens iris-ring, for making automatic exposure corrections in response to continuous changes in camera speed of the motion picture camera. The automatic exposure correction system includes an iris-ring drive mechanism and a camera speed aperture computer. The iris-ring drive mechanism includes a servo motor and a reduction gearhead which has an output shaft and a multi-turn variable resistor which has a rear shaft which a torque limiting clutch mechanically couples to the output shaft of the servo motor and the reduction gearhead. The iris-ring drive mechanism also includes a second toothed pulley which mechanically couples the front shaft of the multi-turn variable resistor to the lens iris-ring through a toothed band and the first toothed pulley. The front shaft of the multi-turn variable resistor drives the lens iris-ring continuously through a plurality of f/stop settings. The camera speed aperture computer includes an electronic processing and control circuit for processing data relating to camera speed of the motion picture camera and the position of the front shaft of the multi-turn variable resistor. The electronic processing and control circuit sends a control signal to the servo motor in order to drive the shaft of the multi-turn variable resistor thereby driving the lens iris-ring to the correct f/stop setting for the camera speed.

8 Claims, 3 Drawing Figures

AUTOMATIC EXPOSURE CORRECTION SYSTEM

BACKGROUND OF THE INVENTION

1. Field of the Invention

The present invention relates to an automatic constant exposure system including a camera speed aperture computer and an iris-ring drive mechanism for use with a motion picture camera and more particularly to an automatic constant exposure system which provides constant film exposure independent of varying camera speed.

2. Description of the Prior Art

In his article, entitled "A New Automatic Iris Control for Motion-Picture Cameras", published in the *Journal of the SMPTE,* Volume 66, July 1957, pages 413-416, Mervin W. La Rue, Jr. has discussed a motion picture camera which incorporates a self-powered compact iris control which takes into account camera speed. The relationship between iris-ring rotation and the resultant iris-opening area is essentially a logarithmic function in most lenses. More specifically, a change in exposure of one f-stop requires the same amount of angular iris-ring movement throughout the entire range of the iris. The system is based on the well-known "exposure meter equation" which is $f^2 = KB_0ST$ where f is the lens-iris setting, K is a constant, $B_0$ is the average subject brightness in candles per square foot, S is the "ASA" emulsion index of the film used and T is the exposure time in second with the logarithm of both sides of the "exposure meter equation" being: $\log f^2 = \log K + \log B_0 + \log S + \log T$. Since the lens-iris is "linear," its angular deflection, I, is proportional to log $f^2$ and the "exposure meter equation" now becomes: $I = C \log f^2 = C (\log K + \log B_0 + \log S + \log T)$. The desired total meter deflection, M, is the iris deflection multiplied by the gear ratio, G, between the contact gear and the iris ring and the "exposure meter equation" finally becomes: $M = CG \log f^2 = CG (\log K + \log B_0 + \log S + \log T)$. Each of these terms has a particular significance. The term CG log T is related to the exposure time and is inversely related to the camera speed. In the motion picture camera which La Rue has described in his article the camera operator manually sets the control barrel for the camera speed to be used. The camera operator does not have the ability to vary the speed of the camera during the shooting of a scene and therefore he does not need to change this setting of the control barrel.

U.S. Pat. No. 4,142,785, entitled Exposure Control Circuit for Camera, issued to Seiichi Saito on Mar. 6, 1979, teaches an automatic circuit for intermittently sensing adequate light condition and adjusting a cine camera iris for same. The circuit includes an astable multivibrator for intermittent switching of power to a Cds cell. Under low light condition the resistance of the cell becomes great enough to stop the oscillation of the multi-vibrator. Prior to the invention described in U.S. Pat. No. 4,142,785 a galvanometer type motor, which was fragile and therefore subject to damage caused by rough handling, automatically closed the iris in accordance with incoming light. In U.S. Pat. No. 4,142,785 the use of a servo motor effectively circumvented the reliability problems but added a new problem in that excessive power consumption was required if the system was permitted to stay on when the camera was not being used to feed film for shooting.

U.S. Pat. No. 4,213,683, entitled Electronic Shutter Driving Device for Camera, issued to Masamichi Furukawa on July 22, 1980, teaches an electronic shutter driving device having a logarithmic expansion circuit which includes no temperature-dependent semiconductor elements such as transistors and field effect transistors and which includes an operational amplifier, a series of resistors which are connected to an inverting input terminal of the operational amplifier, a plurality of capacitors which are interconnected between the inverting input terminal of the operational amplifier and the junctions, respectively, between the resistors and an integrating capacitor between the inverting input terminal and connected between the inverting input terminal and the output terminal of the operational amplifier. A source voltage is applied to the output terminal or a reference voltage input terminal of the operational amplifier. Prior to the invention which U.S. Pat. No. 4,213,683, teaches the electronic shutter driving devices include a logarithmic compression circuit and a logarithmic expansion circuit. The logarithmic expansion circuit generally consisted of transistors and field effect transistors and its operation varied widely depending on the temperature.

In a Moviecam brochure there is a description of a control unit which attaches to a motion picture camera and which allows running speeds to be changed at programmed rates during the shooting of a scene. The time interval in which acceleration or deceleration takes place can be preset on switch banks. Speed changes are made with full automatic exposure corrections via the automatic iris control servo motor coupled to the lens iris ring. The processor is a digital device wherein the iris-ring drive mechanism moves the lens iris-ring in discrete steps rather than in a continuous movement. This is a problem because rapid changes in camera speed may cause non-uniformity in film exposure which a viewer perceives when these changes occur very rapidly. The processor is also dedicated for use only in the Moviecam motion picture camera. The control unit can not be used with other motion picture cameras. Furthermore there are no means provided to interface the control unit with lenses other than those lenses with a particular aperture spacing between f/stops.

In their article, entitled "Special Effects for FIREFOX", published in *American Cinematographer,* Volume 63, Number 9, September 1982, which begins on page 912, John Dykstra, Roger Dorney, Grant McCune, John Sullivan, Mat Beck and Don Trumbull discuss a variety of special effects which they used in the filming of FIREFOX. Among these special effects was the use of electronics which compared and balanced camera speed versus f/stop and which allowed the filming to be done at camera speed which were changing from ½ of a frame per second to 24 frames per second without any visible fluctuation in the final result. The motion picture camera incorporated an exposure compensation device which included a synchro motor which is mechanically coupled to the lens iris by a backlash free gearing. The electronics included a personal computer and a device for controlling camera frame and for counting frames which is electrically coupled to the computer and which signals the computer when it has counted a frame. The electronics also includes a device for controlling the lens iris through a remote servo motor and, when given a reference exposure, computing and setting the proper f/stop for every camera speed from 24 frames per second to ½ per second so that in the filming of the jet in FIREFOX the apparent speed of the jet could be varied continuously with constant exposure and proper streaking. The difficulty with using the personal computer for the electronics is that the personal computer is bulky in size which is disadvantageous and is also inefficient because its hardware and software are not dedicated to the purpose of maintaining constant film exposure in response to changes in camera speed of a motion picture camera.

SUMMARY OF THE INVENTION

In view of the foregoing factors and conditions which are characteristic of the prior art it is the primary object of the present invention to provide an automatic constant exposure system which includes a camera speed aperture computer and an iris-ring drive mechanism for use with a motion picture camera which provides constant film exposure independent of varying camera speed.

It is another object of the present invention to provide an automatic constant exposure system wherein the iris-ring drive mechanism does not moves the lens iris-ring in discrete steps, but rather moves in a continuous movement so that there are no visual discontinuities as a result of rapid changes in camera speed.

It is still another object of the present invention to provide an automatic constant exposure system which has a small and compact dedicated processing unit which is efficient and which may be used in a variety of motion picture cameras in conjunction with many different lenses.

It is yet another object of the present invention to provide an automatic constant exposure system which is constructed of rugged components.

In accordance with the present invention an embodiment of an automatic exposure correction system for use in combination with a motion picture camera, which includes a a lens barrel, a lens iris-ring and a first toothed pulley which is mechanically coupled to the lens iris-ring, for making automatic exposure corrections in response to continuous changes in camera speed of the motion picture camera is described. The automatic exposure correction system includes an iris-ring drive mechanism and a camera speed aperture computer. The iris-ring drive mechanism includes a servo motor and a reduction gearhead which has an output shaft and a multi-turn variable resistor which has a rear shaft which a torque limiting clutch mechanically couples to the output shaft of the servo motor and the reduction gearhead. The iris-ring drive mechanism also includes a second toothed pulley which mechanically couples the front shaft of the multi-turn variable resistor to the lens iris-ring through a toothed band and the first toothed pulley. The front shaft of the multi-turn variable resistor drives the lens iris-ring continuously through a plurality of f/stop settings. The camera speed aperture computer includes an electronic processing and control circuit for processing data relating to camera speed of the motion picture camera and the position of the front shaft of the multi-turn variable resistor. The electronic processing and control circuit sends a control signal to the servo motor in order to drive the shaft of the multi-turn variable resistor thereby driving the lens iris-ring to the correct f/stop setting for the camera speed.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
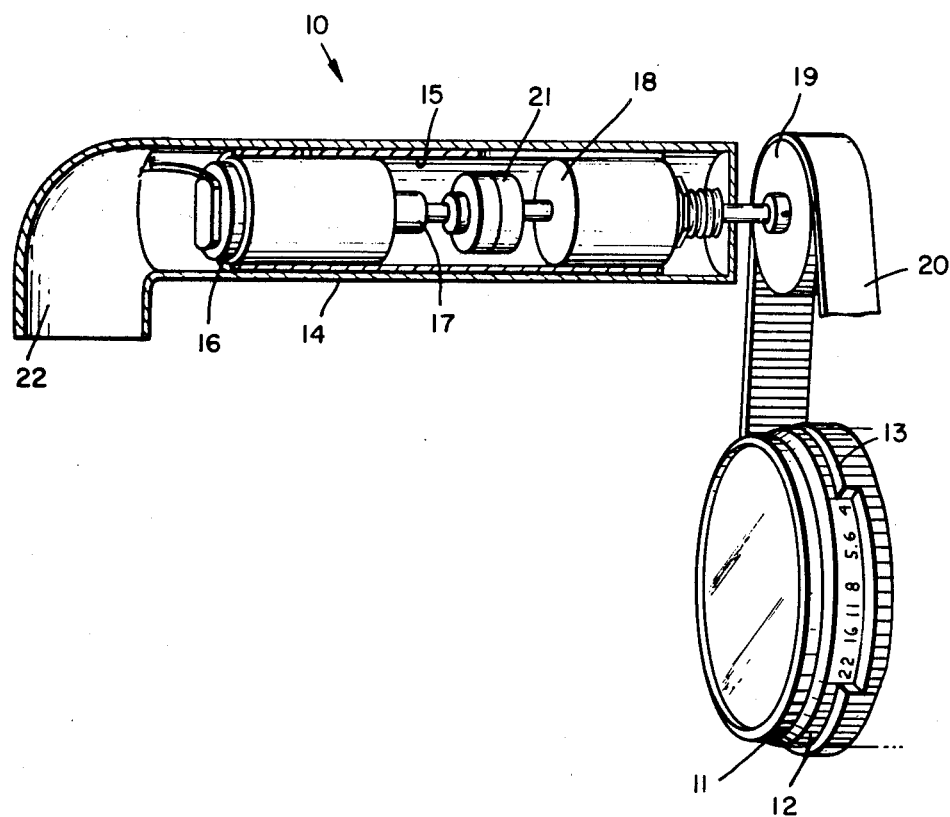
FIG. 1 is a side elevational view in cross-section of an iris-ring drive mechanism which is used in combination with a lens barrel of a motion picture camera, a portion of which includes a lens iris-ring which is fixedly coupled to a first tooth pulley, are shown in a perspective view, and which is constructed in accordance with the principles of the present invention.

In order to best understand the present invention it is necessary to refer to the following description of its preferred embodiment in conjunction with the accompanying drawing. The present invention is an automatic exposure correction system which includes an iris-ring drive mechanism 10 and a camera speed aperture computer. Referring to FIG. 1 the iris-ring drive mechanism 10 for use in combination with a motion picture camera which includes a lens barrel 11, an lens iris-ring 12 and a first toothed pulley 13 which is fixedly coupled to the lens iris-ring 12 for making automatic exposure corrections in response to continuous changes in camera speed of the motion picture camera. The iris-ring drive mechanism 10 includes a housing 14 into which a casing 15 is slidably and inserted coupled, a servo motor 16 which is disposed in and fixedly coupled to the casing 15 and which is mechanically coupled to a reduction gearhead 17. The iris-ring drive mechanism 10 also includes a multi-turn variable resistor 18 the rear shaft of which is mechanically coupled to the reduction gearhead 17 and front shaft of which is fixedly coupled to a second toothed pulley 19 which is mechanically coupled to the drive shaft of the multi-turn variable resistor 18. A toothed band 20 mechanically couples the first toothed pulley to the second toothed pulley 19. The front shaft of the multi-turn variable resistor 18 mechanically drives the lens iris-ring 12 continuously through a plurality of f/stop settings. A torque limiting clutch 21 mechanically couples the output shaft of the reduction gearhead 17 and the servo motor 16 to a rear shaft of the multi-turn variable resistor 18 the purpose of which is to protect the multi-turn variable resistor 18, the reduction gearhead 17 and the lens barrel 11 from damage which would result from excessive angular rotation of the lens iris-ring 12 through the first toothed pulley 13 and the toothed band 20. In another embodiment the first and second toothed pulleys 13 and 19 may be directly mechanically coupled.

Figure 2:
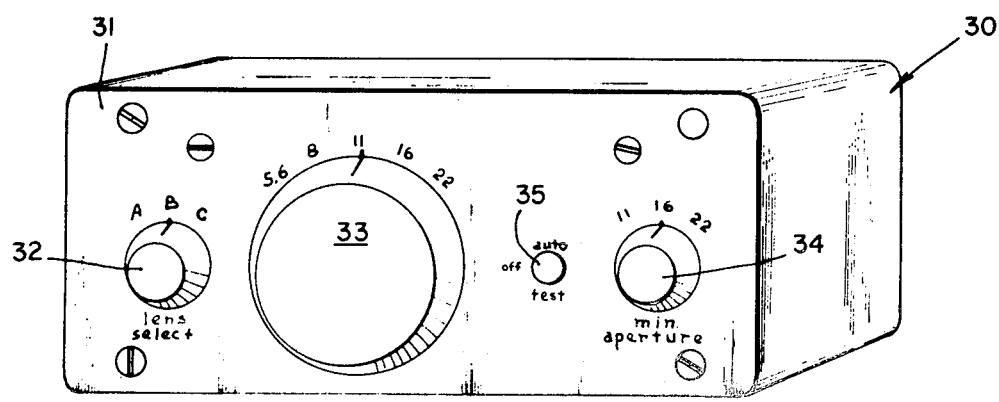
FIG. 2 is a perspective view of a camera speed aperture computer for use in combination with the iris-ring drive mechanism of FIG. 1.

Referring to FIG. 2 in conjunction with FIG. 1 a cable electrically connects the servo motor 16 at a connector 22, which is mechanically coupled to the housing 14, to the camera speed aperture computer 30 includes an electronic processing and control circuit which is disposed in a housing 31 with a front panel. The electronic processing and control circuit automatically adjusts the lens aperture in response to varying camera speeds in order to maintain constant film exposure. By maintaining constant film exposure as camera speed is varied the speed aperture computer allows the cinematographer to use camera speed as an artistic variable so that the appearance of motion as captured on film may be manipulated.

The relationship between the angle, $\theta$, of rotation of the lens iris-ring 12 and the f/stop, f, is defined by a first equation: $f = C_1 \exp(-C_2\theta/\theta_0)$ so long as the f/stops are equidistantly spaced along the iris-ring 12 by the angle $\theta_0$. A second equation expresses the well known relationship between the f/stop, "f", film sensitivity, "ASA", and exposure time, T, and is: $f^2 = (k_1)(ASA)(T)$ where $k_1$ is a constant. Since the running speed, S, of the motion picture camera is inversely related to the exposure time, T, the second equation may be rewritten as: $f^2 = (k_2)(ASA)(S^{-1})$ where $k_3$ is a constant. By combining the first equation with the second rewritten equation a third equation becomes: $S = k_3 \exp[2(\theta/\theta_0)C]$ where $k_3$ is a constant.

Referring to FIG. 2 the camera speed aperture computer 30 is used for processing data relating to camera speed of the motion picture camera and position of the shaft of the multi-turn variable resistor 18. The camera speed aperture computer 30 is electrically coupled to a camera camera speed encoder on the motion picture camera and is also electrically coupled to the servo motor 16. The camera speed aperture computer 30 sends a control signal to the servo motor 16 in order to drive the rear shaft of the multi-turn variable resistor 18 so that the lens iris-ring 12 is driven to the correct f/stop setting for the camera speed.

The camera speed aperture computer 30 has a lens select switch 32, an initial exposure control setting apparatus 33, a minimum aperture setting apparatus 34 and an automatic test switch 35, all of which are disposed on the front panel of the housing 31.

Figure 3:
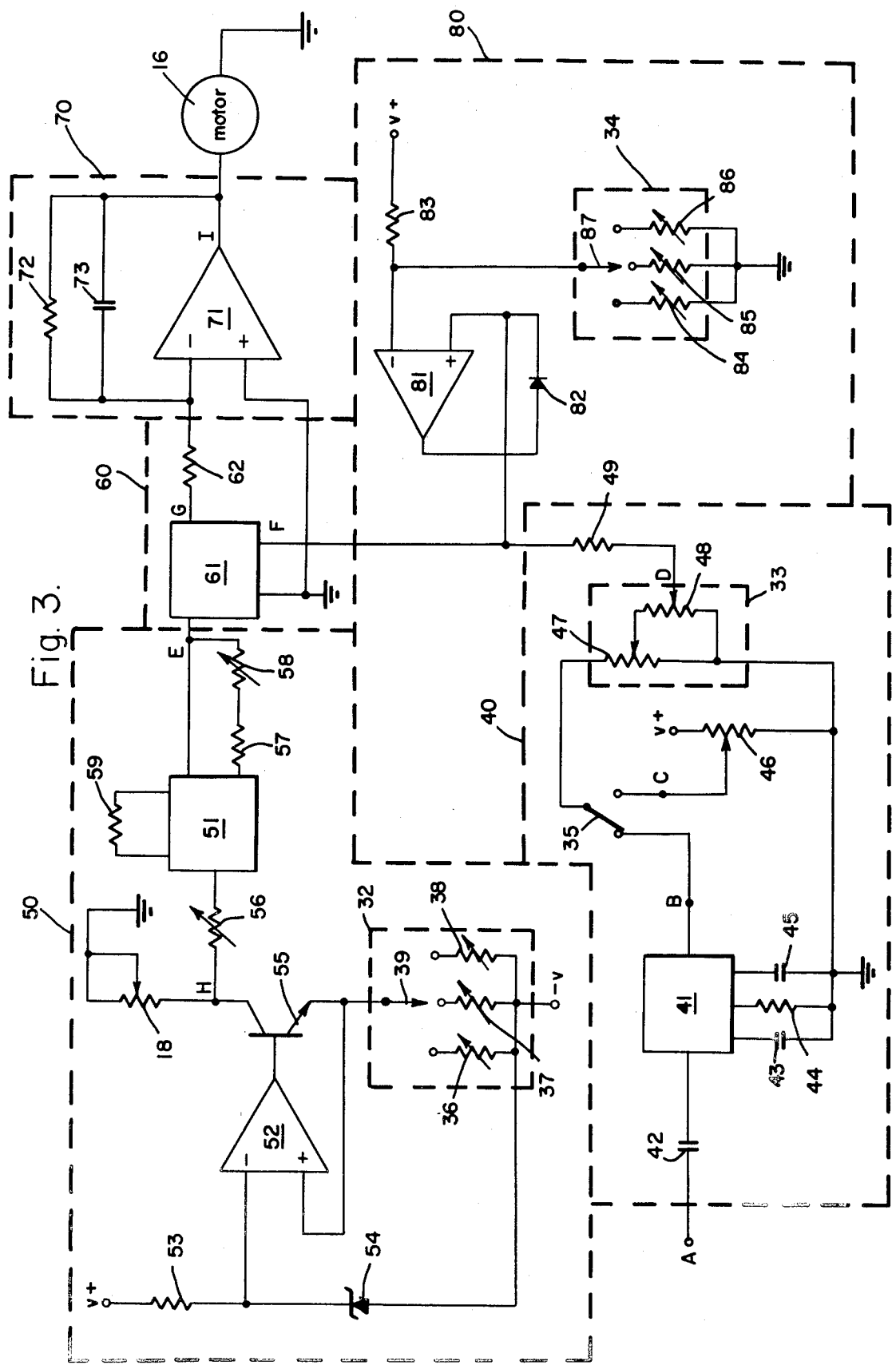
FIG. 3 is a schematic diagram of an electronic processing and control circuit of the camera speed aperture computer of FIG. 2 and the servo motor of the iris-ring drive mechanism of FIG. 1.

Referring to FIG. 2 in conjunction with FIG. 3 the lens select circuit 32 includes a first variable resistor 36, a second variable resistor 37 and a third variable resistor 38 all of which are electrically coupled to a negative voltage source, $-v$. The lens select circuit 32 also includes a switch 39 which is selectively electrically coupled to one of the three variable resistors 36, 37 and 38.

Referring to FIG. 3 in conjunction with FIG. 1 and FIG. 2 the electronic processing and control circuit of the speed aperture computer 30 includes a camera speed converting circuit 40 which generates a first voltage which is proportional to the camera running speed and includes a frequency to voltage converter module 41. Voltage pulses are generated by a camera speed encoder which is mechanically coupled to the camera motor. The frequency of the pulses is directly proportional to the camera running speed. A first capacitor 42 electrically couples the camera speed encoder at point A to the to the input terminal of the frequency to voltage converter 41 which receives the pulses from the camera speed encoder. A second capacitor 43 and a first resistor 44 electrically couple in parallel the scaling input terminal of the frequency to voltage converter 41 and in conjunction with each other determine the proportionality of the voltage, $V_B$, a point B to the input frequency, $f_A$, of voltage pulses which appear at point A in accordance with a fourth equation: $V = (C_{43})(R_{44})(k_4)S$ where $k_4$ is a constant and S is the camera running speed. A fourth capacitor 45 electrically couples the frequency to voltage converter 41 to ground and removes the ripple component which without the fourth capacitor 45 would be present at the output terminal of the frequency to voltage converter 41 at point B. When the automatic test switch 35 is in a first position, the automatic test switch connects the output terminal of the frequency to voltage converter 41 at point B to the initial exposure control setting apparatus 33. A calibrating potentiometer 46 electrically couples a positive voltage source, $+v$, to ground and, when the automatic test switch 35 is in a second position connects the output terminal of the frequency to voltage converter 41 at point B to the wiper of the calibrating potentiometer 46.

Referring to FIG. 3 in conjuncion with FIG. 2 the initial exposure control setting apparatus 33 includes a first potentiometer 47 and a second potentiometer 48 which generally have different resistance values but whose wipers are mechanially coupled to a common shaft. A second resistor 49 is electrically coupled to the wiper of the second potentiometer 48. The ratio of the resistances of the first and second potentiometers 47 and 48 is chosen such that the fraction of voltage present at the wiper of the potentiometer 48 at point D changes in an approximately exponential fashion with respect to the angle of shaft rotation.

Referring to FIG. 3 the electronic processing and control circuit of the speed aperture computer 30 also has an exponentiating circuit 50 which includes an exponential expanding module 51 and which generates a second voltage which is made exponentially proportional to the angular position of the lens iris-ring and which also forces the second voltage to equal the first voltage which is proportional to the camera running speed.

A section of the exponentiating circuit 50 generates a voltage which is exponentially related to the angular position of the iris in accordance with the third equation. The setting of one of the three variable resistors 36, 37 and 38 which is selected by the switch 39 of the lens select switch 32 and is chosen so that a current source which includes a first amplifier 52 generates a current. The current source also includes a third resistor 53 which electrically couples a positive voltage source, $+v$, to the inverting input terminal of the first amplifier 52, a zener diode 54 which electrically couples a negative voltage source, $-v$, to the inverting input terminal of the first amplifier 52 and a transistor 55 the base of which is electrically coupled to the output terminal of the first amplifier 52. The non-inverting input terminal of the first amplifier 52 is electrically coupled to the emitter of the transistor 55 and the switch 39 of lens select circuit 32. The collector of the emitter 55 is electrically coupled to a first terminal of the multi-turn variable resistor 18 the wiper and the second terminal of which are electrically coupled to ground. The first amplifier 52 forces the voltage appearing at the emitter of the the transistor 55 to equal the breakdown voltage, $V_Z$, of the zener diode 54 so that when the switch 39 of the lens select circuit 32 is on a first position connecting the first variable resistor 36 having a resistance value, $R_{36}$, to the emitter of the transistor 55 the current through the first variable resistor 36 is given by a sixth equation: $i = V_Z/R_{36}$. When the switch 39 of the lens select circuit 32 is on either a second or third switch position the resistance value, $R_{37}$ or $R_{38}$, of either the second or third variable resistor 37 or 38 is substituted into the sixth equation for the resistance valve, $R_{36}$, of the first variable resistor 36 in determining the current through the multi-turn variable resistor 18.

Since the angular spacing between the f/stop interval on different lenses is not generally the same, switching circuit 32 in conjunction with the three variable resistors 36, 37 and 38 allow the control unit to be calibrated for use with three lenses having different angular spacing between between f/stops. The voltage at point H is the product of the current given by the sixth equation and the resistance of the multi-turn variable resistor 18 which is proportional to the angular rotation, $\theta$, of the shaft of the multi-turn variable resistor 18. For the case when the switch 39 is in a first position, the voltage at point E is given by a seventh equation: $V_E = k_5(\theta)(V_Z/R_{36})$ where $k_5$ is a constant.

Still referring to FIG. 3 a fourth variable resistor 56 electrically couples the input terminal of the exponential expanding module 51 to the collector of the transistor 55. A fourth resistor 57 and a fifth variable resistor 58 which are electrically coupled in series to the output terminals of the exponential expanding module 51. A fifth resistor 59 electrically couples the scaling terminals of the exponential expanding module 51. The exponential expanding module 51 generate a voltage, $V_E$, at point E which is defined by an eighth equation: $V_E = k_6 [(R_{57}+R_{58})/R_{59}] \exp[(R_{56})(V_H)k_7]$ where $k_6$ and $k_7$ are constants. The voltage gain of the exponential expanding module 51 which is determined by the differential of the voltage, $V_E$, with respect to the voltage, $V_H$, at the multi-turn variable resistor 18 is not a constant, but is proportional to the voltage $V_E$ and is defined by a ninth equation: $dV_E/dV_H = (R_{56})(k_7)V_E$.

Still referring to FIG. 3 the electronic processing and control circuit further includes a functional circuit 60 which includes a functional module 61 which has a first input terminal which is electrically coupled to the output terminal of the exponential expanding module 51 at point E and a second input terminal which is electrically coupled to the second resistor 49 at point F and an output terminal at point G. The relationship between the voltages appearing at the input terminals is given by a tenth equation: $V_G = [(V_E-V_F)/V_E]$. A sixth resistor 62 having a resistance value, $R_{62}$, electrically couples the inverting input terminal of a second amplifier 71 of an amplifying circuit 70 the non-inverting input terminal of which is electrically coupled to ground. A seventh resistor 72 having a resistance value, $R_{72}$, and a fourth capacitor 73, which are electrically coupled in parallel, electrically couple the inverting input terminal of the second amplifier 71 to the output terminal of the second amplifier 71 and the input terminal of the servo motor 16. The functional circuit 60 performs two functions in conjunction with the amplifing circuitry 70 and the servo motor 16 forcing the voltages $V_E$ and $V_F$ to be equal and maintaining constant gain independent of iris position. The second amplifier 71 has a voltage gain, $V_I/V_G$, proportional to the ratio of resistances, $R_{72}/R_{62}$. The fourth capacitor 73 restricts the bandwidth of the second amplifier 71 so that extraneous noise which is picked up by cable connections will not effect the operation of the second amplifier 71. The second amplifier 71 also forces the potential at point G to ground enforcing the equality of $V_E=V_F$.

By causing the servo motor 16 to turn both the shaft of the multi-turn variable resistor 18 as well as the lens iris-ring 12 and by exponentially expanding the voltage appearing at the point H which is proportional to the angular position of the lens iris-ring 12 there is generated a voltage $V_E$ which is proportional to the square of the f/stop. The functional module 61 in conjunction with the amplifing circuit 70 and the servo motor 16 forces the voltage, $V_E$, which is proportional to the square of the f/stop setting, at point E to equal the voltage, $V_F$, which is proportional to the camera running speed at point F thereby enforcing the relation stated by the previously stated third equation between the camera running speed and the angular position of the lens iris-ring 12. As a result of this relation the exposure control setting apparatus 33 is able to adjust the lens iris-ring 12 relative to the camera running speed. The position of the angle of rotation of the exposure control setting apparatus 33 determines the fraction of the voltage, $V_B$, at point B which is proportional to the camera running speed and which is applied to the input terminal at point F of the functional module 61 thereby determining the angular position of the lens iris-ring 12 for a given running speed of the camera. Since the customary camera running speed is 24 frames per second for synchronized sound recording the calibration of the exposure control setting apparatus 33 is based on a running speed of 24 frames per second. The calibrating potentiometer 46 is adjusted so that its wiper is at the same potential as point B when the camera is at a running speed of 24 frames per second. When the automatic test switch 35 is in a second position the input terminal of the exposure control setting apparatus 33 is at the same potential as if the camera were running at 24 frames per second. The actual iris setting of the lens may therefore be checked without having to run film through the camera.

Referring still again to FIG. 3 a voltage clamping circuit 80 includes a third amplifier 81, a diode 82 which electrically couples the non-inverting input terminal of the third amplifier 81 to the output terminal of the third amplifier 81, an eighth resistor 83 which electrically couples the inverting input terminal of the third amplifier 81 to a positive voltage source, $+v$. The minimum aperture setting apparatus 34 includes a first variable resistor 84, a second variable resistor 85 and a third variable resistor 86. The minimum aperture setting apparatus 34 also includes a switch 87 which electrically couples to one of the three variable resistors 84, 85 and 86. The current passes from the positive voltage supply, $+v$, through the eighth resistor 83, the switch 87 and one of the three variable resistors 84, 85 or 86 and causes a voltage, $V_J$, to appear at point J where the non-inverting input of the third amplifier 81. If the voltage, $V_F$, at point F drops below the voltage at point J the current from the output terminal of the third amplifier 81 passes through the diode 82 and forces the voltage, $V_F$, at point F to always remain above the voltage, $V_J$, at point J. If the voltage, $V_F$, at point F is greater than the voltage, $V_J$, at point J the diode 82 will be reverse-biased and will not affect the voltage, $V_F$, at point F. In order to achieve uniform voltage gain which is independent of the angular position of the iris it is necessary to divide out the factor $V_E$ from the expression for voltage gain by the ninth equation leaving an eleventh equation which is: $(1/V_E)dV_E/dV_H = (R_{56})(k_7)$. The voltage clamping circuit 80 provides a uniform voltage gain which is independent of the iris position. The voltage clamping circuit 80 prevents the servo motor 16 from attempting to close the lens iris-ring 12 beyond its minimum aperture and thereby prevents damage to either the lens or the iris-ring drive mechanism 10. The minimum aperture setting apparatus programs a minimum aperture for the three settings most commonly found in motion picture lenses: f22, f16, and f11.

From the foregoing it can be seen that an automatic exposure correction system which provides constant film exposure independent of varying camera speed and which includes an iris-ring drive mechanism and a camera speed aperture computer for use in combination with a motion picture camera has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. An automatic exposure correction system for use in combination with a motion picture camera including a lens barrel, a lens iris-ring and a first toothed pulley which is mechanically coupled to the lens iris-ring for making automatic exposure corrections in response to continuous changes in camera speed of the motion picture camera, said automatic exposure correction system including an iris-ring drive mechanism and a camera speed aperture computer, said iris-ring drive mechanism comprising:
   a. a multi-turn variable resistor having a rear shaft and a front shaft;
   b. driving means for driving said multi-turn variable resistor which is mechanically coupled to said rear shaft of said multi-turn variable resistor; and
   c. coupling means for mechanically coupling the first toothed pulley and the lens iris-ring to said front shaft of said multi-turn variable resistor whereby said front shaft of said multi-turn variable resistor mechanically drives the lens iris-ring continuously through a plurality of f/stop settings, and said camera speed aperture computer comprising:
   a. processing means for processing data relating to camera speed of the motion picture camera and the position of said front shaft of said multi-turn variable resistor electrically coupled to said multi-turn variable resistor and the motion picture camera and also electrically coupled to said driving means whereby said processing means sends a control signal to said driving means in order to drive said rear shaft of said multi-turn variable resistor so that the lens iris-ring is driven to the correct f/stop setting for a particular camera speed.

2. An automatic exposure correction system for use in combination with a motion picture camera according to claim 1 wherein said driving means comprises:
   a. a servo motor;
   b. a reduction gearhead which is mechanically coupled to said servo motor and which has an output shaft; and
   c. a torque limiting clutch which mechanically couples said rear shaft of said multi-turn variable resistor to the output shaft of said reduction gearhead.

3. An automatic exposure correction system for use in combination with a motion picture camera according to claim 2 wherein said coupling means comprises:
   a. a second toothed pulley which is mechanically coupled to said front shaft of said multi-turn variable resistor; and
   b. a toothed band which mechanically couples said second toothed pulley to to the first toothed pulley.

4. An automatic exposure correction system for use in combination with a motion picture camera according to claim 1 wherein said processing means comprises:
   a. an electronic processing and control circuit for processing data relating to camera speed of the motion picture camera and the position of said front shaft of said multi-turn variable resistor.

5. An automatic exposure correction system for use in combination with a motion picture camera according to claim 4 wherein said electronic processing and control circuit comprises:
   a. a camera speed encoder which is mechanically coupled to the camera motor of the motion picture camera and which generates voltage pulses the frequency of which is proportional to the camera running speed;
   b. camera speed converting means for generating a first voltage which is also proportional to the camera running speed, said camera speed converting means being electrically coupled to said speed encoder;
   c. initial exposure control setting means for electrically coupled to said camera speed converting means;
   d. exponentiating means for generating a second voltage which is exponentially related to the angular position of the lens iris-ring and proportional to the square of the f/stop and forcing the second voltage to equal the first voltage; and
   e. controlling means for sensing when the first and second voltages which are proportional to the camera running speed and the square of the f/stop, respectively, are no longer equal to each other and sending a correction signal to said driving means.

6. An automatic exposure correction system for use in combination with a motion picture camera according to claim 5 wherein said camera speed converting means comprises a frequency to voltage converter module.

7. An automatic exposure correction system for use in combination with a motion picture camera according to claim 6 wherein said exposure control setting means comprises a first potentiometer and a second potentiometerand which generally have different resistance values but whose wipers are mechanically coupled to a common shaft with a resistor being electrically coupled to the wiper of said second potentiometer.

8. An automatic exposure correction system for use in combination with a motion picture camera according to claim 5 wherein said electronic processing and control circuit also comprises electronic means for maintaining constant gain which is independent of the angular position of the lens iris-ring which electrically couples said exponentiating means to said controlling means.

* * * * *